(45.)
M. B. FRASER.
Improvement in Cheese Hoops.
No. 122,520.  Patented Jan. 9, 1872.
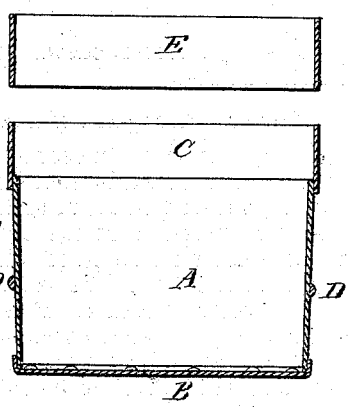
Fig. 3
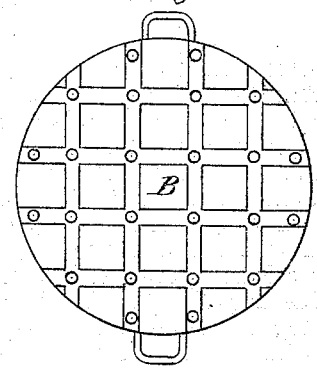
Fig. 2
Fig. 1
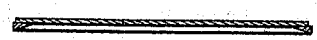
Fig. 5
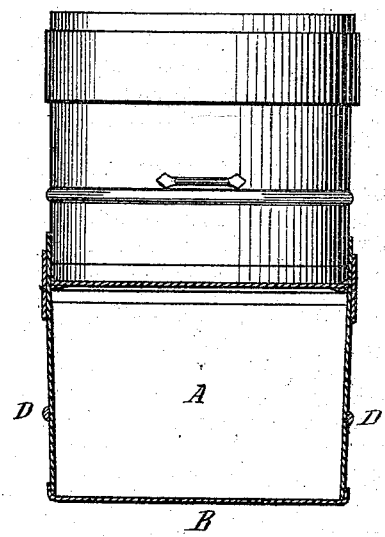
Fig. 6
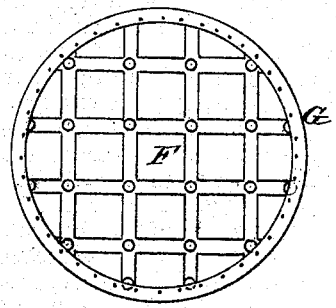
Fig. 4
Witnesses
Geo Barnard
C Petrie
Inventor
Milton B. Fraser 121,520

UNITED STATES PATENT OFFICE.

MILTON B. FRASER, OF ROME, NEW YORK.

IMPROVEMENT IN CHEESE-HOOPS.

Specification forming part of Letters Patent No. 122,520, dated January 9, 1872.

SPECIFICATION.

I, MILTON B. FRASER, of Rome, in the county of Oneida and State of New York, have invented certain Improvements in Cheese-Hoops, of which the following is a specification:

My hoop is metallic, made in sections and riveted together. The lower section is tapered so that the bottom would enter the top of the same, and a grooved and perforated bottom firmly put on. The upper section fits closely the outside and top of the lower one, and is firmly riveted on. A loose rim is then rolled up and placed inside of the upper and on the top of the lower section. A swaged hoop is put on about midway of the lower section having the same exterior diameter as the upper section of the hoop—the handles just above that. The follower is grooved and perforated the same as the bottom, and bound around the edge with rubber, or other soft substance, to make a close fit.

The object of the peculiar construction of this hoop is to provide: First, by the grooved and perforated bottom and follower for the better escape of whey and air. Second, by the elastic ring on the follower, for the prevention of rim on the cheese. Third, by the loose rim for firmly holding the bandage until the follower has passed into it, when the rim will loosen, and the bandage will draw before it will tear. Fourth, by the taper of the lower section for the telescopic movement of one hoop into another to keep them in line under pressure in a horizontal press, (for which it is more particularly designed,) also to make the cheese slip out easily. Fifth, by the combination of the several parts for molding a cheese in bandage in perfect shape and rind, and for saving labor, all of which objects are fully attained.

Description of Drawing.

Figure 1 is a sectional view of a hoop embodying my invention. Fig. 2 is a view of the bottom of same. Fig. 3 is a sectional view of the loose rim or bandager. Fig. 4 is a view of the side of the follower that goes next to the cheese. The other side is fairly represented in Fig. 2, with the handles off. Fig. 5 is a transverse sectional view of the same, showing position of elastic ring. Fig. 6 is a view of a complete hoop entering another, shown sectionally for better illustration.

General Description of Drawing.

A is the lower or main section of the hoop, into which the cheese is intended to be pressed; made, say, one-fourth of an inch higher than the desired thickness of the cheese, tapered toward the bottom enough so that the bottom would enter the top of the same loosely, and strongly riveted together. B is the bottom, grooved and perforated as shown in Figs. 1 and 2. This grooving may be done by indentation in a metallic plate, or by cutting in wood in any manner by which the whey and air may escape from the center to the circumference, and perforated in the grooves and firmly put on so that it can be handled when full of curd. C is the upper section, about four inches wide, not tapered, fitting closely around the outside of the top of section A, and riveted on. D is a hoop, three-fourths inch wide, swaged so that its external diameter will be the same as the upper section C—to level it in a horizontal press, and determine the depth it may penetrate the next hoop. E is the loose rim or bandager, made of the same material, about four inches wide, or wide enough to hold the unpressed curd, rolled up, the ends nearly touching when placed inside of section C. This rim extends above section C, for the convenience of handling, and is turned a trifle out on the upper edge to admit the follower easily. A clasp-button, or other suitable fastening, may be attached, if necessary, near the upper edge and joint of the rim, to hold the ends together while putting to its place. F is the follower, made in the same manner that the bottom is, with elastic ring G attached in any suitable way near the inner edge that it may come out easily. The ring G should project over the follower one-sixteenth of an inch all around it.

Directions for Using in the Fraser Gang Press.

First put a round cap cloth smoothly in the bottom of hoop; then slip a bandage on the right wrist; then take the rim, and lap the ends by about four inches, and hold with thumb and finger of left hand; catch the edge of bandage under the thumb and sweep the bandage around it. Now, let the rim expand, and hold it and even it on the rim. Then snap the ends together, straining the bandage tight, and put in its place, the bandage a little more than touching the bottom of hoop. Prepare all your hoops in this way and fill them. Now put on another cap cloth and enter the followers. Turn down the first hoop and slip it over a thick follower on the end of press designed to press the first cheese; turn down the next and slip it over the bottom of the first, and so on, until the desired number of cheeses are in, and then apply the screw. Occasionally tighten up. No more to be done until taken out for the tables; then the last edge of the bandage to be turned and greased down.

Claims.

I claim as my invention—

1. The bottom B and follower F of a cheese-hoop, grooved and perforated as shown, substantially as and for the purposes hereinbefore set forth.

2. The combination of sections A and C and rim E, substantially as and for the purpose hereinbefore set forth.

3. The combination, with sections A and C and rim E, of the bottom B and follower F, substantially as and for the purpose hereinbefore set forth.

4. The combination, with sections A and C and rim E, of the bottom B and follower F of the hoop D, substantially as and for the purposes hereinbefore set forth.

MILTON B. FRASER.

Witnesses:
GEO. BARNARD,
C. PETRIE.

(45)